US012544725B2

(12) United States Patent
Kuppelwieser et al.

(10) Patent No.: US 12,544,725 B2
(45) Date of Patent: Feb. 10, 2026

(54) CLAMPING PLATFORM FOR A MECHANICAL SHAKER

(71) Applicant: Adolf Kühner AG, Birsfelden (CH)

(72) Inventors: Ralph Kuppelwieser, Pratteln (CH); Tim Bürgin, Füllinsdorf (CH); Mathias Schumacher, Lörrach (DE)

(73) Assignee: ADOLF KÜHNER AG, Birsfelden (CH)

( * ) Notice: Subject to any disclaimer, the term of this patent is extended or adjusted under 35 U.S.C. 154(b) by 494 days.

(21) Appl. No.: 18/207,283

(22) Filed: Jun. 8, 2023

(65) Prior Publication Data

US 2023/0405537 A1 Dec. 21, 2023

(30) Foreign Application Priority Data

Jun. 15, 2022 (DE) ..................... 10 2022 115 068.2

(51) Int. Cl.
*B01F 31/22* (2022.01)
*B01F 31/20* (2022.01)
*B01F 35/42* (2022.01)
*B01F 101/23* (2022.01)

(52) U.S. Cl.
CPC ............ *B01F 31/22* (2022.01); *B01F 31/201* (2022.01); *B01F 35/42* (2022.01); *B01F 2101/23* (2022.01)

(58) Field of Classification Search
CPC .... B01F 31/201; B01F 31/22; B01F 2101/23; B01F 35/421; B01F 35/42; B01L 9/06; B01L 9/50; B01L 2200/025; B01L 2400/0433; B01L 9/523; B01L 9/00; C12M 27/16
USPC ................................................. 366/208–209
See application file for complete search history.

(56) References Cited

U.S. PATENT DOCUMENTS 6,514,465 B2 * 2/2003 Steiner ................. G01N 35/028 422/65
7,054,001 B2 * 5/2006 Geiger ..................... B01L 9/523 356/244
9,126,162 B2 * 9/2015 Simmat .................... B01F 35/42
9,126,200 B2 * 9/2015 Simmat .................. G01N 35/04

(Continued)

FOREIGN PATENT DOCUMENTS

DE 10246211 A1 4/2004
DE 102022115068 B3 * 8/2023 ............. B01L 9/523

OTHER PUBLICATIONS

Search Report Dated Feb. 23, 2023, 4 Pages.

*Primary Examiner* — Charles Cooley
(74) *Attorney, Agent, or Firm* — LUCAS & MERCANTI, LLP

(57) ABSTRACT

A clamping platform for a mechanical shaker, which allows automated release and fastening of microtiter plates that are subject to tolerances, includes at least two mounts arranged pairwise for the releasable fastening of the microtiter plates. The platform includes clamping jaws, on which a compression spring acts, actuatable with a link control having a linear drive. In conjunction with the compression spring, the geometry of the guide links allows compensation for the dimensional tolerances of the microtiter plates that are to be fixed by clamping. The spring force of the compression spring is determined such that the clamping jaws that are loaded by the compression spring exert the required clamping force in the deployed position onto the microtiter plates to be fixed.

14 Claims, 4 Drawing Sheets

(56) References Cited

U.S. PATENT DOCUMENTS

| | | | | |
|---|---|---|---|---|
| 9,132,428 | B2 * | 9/2015 | Simmat | B01L 9/523 |
| 11,298,701 | B2 * | 4/2022 | King | B01L 9/523 |
| 12,168,233 | B1 * | 12/2024 | King | B01F 35/2214 |
| 2007/0029342 | A1 | 2/2007 | Cross | |
| 2012/0128459 | A1 * | 5/2012 | Hoyer | G01N 35/04 414/754 |
| 2013/0011224 | A1 * | 1/2013 | Hoyer | B01L 9/523 414/222.01 |
| 2014/0193312 | A1 * | 7/2014 | Hoyer | G01N 35/04 414/754 |
| 2020/0164365 | A1 * | 5/2020 | King | B01F 31/24 |
| 2023/0405537 | A1 * | 12/2023 | Kuppelwieser | C12M 27/16 |

* cited by examiner

CLAMPING PLATFORM FOR A MECHANICAL SHAKER

CROSS-REFERENCE TO RELATED APPLICATIONS

The present invention claims priority to German patent application no. DE 10 2022 115 068.2 filed Jun. 15, 2022, the entire contents of which is incorporated herein by reference.

BACKGROUND OF THE INVENTION

The invention relates to a clamping platform for a mechanical shaker having a plurality of mounts, each for the releasable fastening of a rectangular microtiter plate on the clamping platform.

In biotechnology and process technology, shaken reactor systems are used for the culture of biological systems. The mechanical shakers are usually orbital shakers and consist of a drive unit and a horizontal support, a tray for receiving the vessels to be shaken. Depending on the application, the mechanical shaker is situated in an incubator. According to the intended use, the trays may receive various vessels such as Erlenmeyer flasks, test tubes, or microtiter plates (MTP).

The conventionally rectangular microtiter plates usually consist of plastic, generally polystyrene and sometimes polyvinyl chloride, and for very special applications also of glass; they contain a large number of wells isolated from one another, which are arranged in rows and columns in a 2×3, 3×4, 4×6, 6×8, 8×12, 16×24, 32×48 or 48×72 matrix, so that a microtiter plate has between 6 and 3456 wells. There are many formats, all of which have the same base area and a sometimes variable height. According to the ANSI standard, the base area (length×width) at the recommendation of the Society for Biomolecular Screening (SBS) is 127.76 mm×85.48 mm.

Microtiter plates are used for a very wide variety of microbiological working operations. Typical fields of use are cell culture or the screening of bioreactions. Because of the large number of wells and by using identical types, microtiter plates are suitable for culture and for tests with a large number of samples.

The filling is carried out manually, conventionally with multichannel pipettes, or, for a high throughput, usually with pipetting robots. Many instruments (plate readers) are available for reading the measurement results, these being specialized for particular chemical or physical changes.

In order to monitor the experiments, the microtiter plates regularly need to be removed from the incubator, or lifted from the platform of the mechanical shaker. Throughout the shaking process during the culture, the individual microtiter plates must be firmly connected to the platform of the mechanical shaker. In order to remove the microtiter plates, however, this connection needs to be released. The platform therefore has a mechanism for clamping the microtiter plates and for this reason will also be referred to below as a clamping platform. In the prior art, the release and clamping of the microtiter plates is still carried out manually.

As a result of automation of the removal and delivery of the microtiter plates, the release and fastening of the microtiter plates on the clamping platform likewise needs to be automated. The uniform, standardized base area of the microtiter plates is subject to tolerances. According to the standard, deviations of >1 mm and <2 mm are acceptable. In practice, tolerances extending beyond the standard are sometimes even encountered. These tolerances must be reliably accommodated for the automated release and fastening of the microtiter plates on the clamping platform.

BRIEF SUMMARY OF THE INVENTION

On the basis of this prior art, an object of the present invention is to provide a clamping platform for a mechanical shaker for use in an automated environment and having a plurality of mounts, each for the releasable fastening of a rectangular microtiter plate on the clamping platform, which allows automated release and fastening of microtiter plates that are subject to tolerances. The clamping platform is furthermore intended to be operable with occupied as well as unoccupied mounts. Further requirements for automated operation are a low number of drives, a small installation space and a low shaken weight.

This Object is Achieved by a Clamping Platform

The automated clamping platform for microtiter plates has a plurality of mounts for the releasable fastening of microtiter plates. The microtiter plates themselves may be received by the mounts on the clamping platform in a microtiter plate holder, a so-called Duetz system. For deep-well microtiter plates with filter lid, Adolf Kühner AG, Dinkelbergstrasse 1, CH-4127 Birsfelden (Basle) has designed a Duetz mount which on the one hand ensures stable holding of the microtiter plate and on the other hand prevents contamination between the wells (accessed at https://kuhner.com/de/produkte/data/Zubehoer_Halterungen_Mikrotiterplattenhalter.php on Jun. 3, 2022).

The link control for moving the clamping jaws from the retracted position into the deployed position and vice versa has the effect that not every mount needs to be occupied. The displacement path of a clamping jaw, loaded by the compression spring, of an unoccupied mount is limited in the deployed position by the guide element bearing on the guide edge of the guide link.

Tolerances of the microtiter plates to be mounted have the effect that the clamping jaws of a pair of mounts are sometimes deployed to different extents. In order nevertheless to apply approximately the same clamping force onto both microtiter plates, a tolerance compensation is provided. The geometry of the guide link, in particular the width of the guide link in proportion to the dimensions of the guide element, in conjunction with the compression spring, allows the required tolerance compensation by the guide element being movable away from the outwardly facing guide edge of the guide link against the force of the compression spring during the movement of the clamping jaw from the retracted position into the deployed position.

The spring force of the compression spring is determined in such a way that the clamping jaws loaded by the compression spring exert the required clamping force on the two mutually opposite microtiter plates in the deployed position. In the event of occupancy on one side, only one of the two clamping jaws loaded by the compression spring exerts the required clamping force.

In one advantageous embodiment, the mounts of a plurality of pairs of mounts are arranged mirror-symmetrically along a plurality of straight lines running parallel to one another on the upper side of the clamping platform. If twelve microtiter plates are intended to be placed and fastened on the clamping platform, for example, the mounts of three pairs may be arranged mirror-symmetrically with respect to a first straight line and the mounts of three further pairs may be arranged mirror-symmetrically with respect to a second straight line. This results in a grid with a four by three pattern, in which the microtiter plates are arranged. This pattern is advantageous in conjunction with certain robots for the automatic handling of microtiter plates.

The clamping jaws of the two mounts of each pair are preferably guided so that they can be moved to and fro perpendicularly to the straight line, or to one of the plurality of straight lines, by a linear guide in relation to the upper side of the clamping platform. The linear guide may be configured simply in terms of design as a sliding guide, wherein, for example, a spring that is arranged on the lower side of the clamping jaw engages in a groove formed in the surface of the clamping platform. The groove may be formed perpendicularly to the straight line over a relatively long length in the surface, so that one groove guides a plurality of clamping jaws. However, it is of course also possible for each clamping jaw to be guided by a separate linear guide.

The clamping face and/or the bearing face of each clamping jaw are/is configured advantageously in terms of design as plane faces. The plane clamping face leads to uniform introduction of the clamping force into the first side edge of the microtiter plate to be fastened, and avoids damage. The plane bearing face ensures secure holding of the ends of the compression spring between the mutually opposite clamping jaws of a pair.

The compression spring is preferably a wound torsion spring, which is compressed and therefore preloaded by compressing the ends between the mutually opposite bearing faces. The spring force of the compression spring, which is partially relaxed in the deployed position of the clamping jaws, determines the clamping forces that act on the microtiter plates of a pair, which are to be mounted.

In another embodiment, each stop is arranged in a fixed position on the clamping platform in such a way that the microtiter plate to be fastened can be brought to bear on the stop with the second side edge and the two shorter side edges that connect the first and the second side edge. A stop that engages around the microtiter plate to be mounted on three side edges prevents movement of the microtiter plate in the direction of the straight line due to a shaking movement of the clamping platform, regardless of the level of the clamping force.

The stop may be configured as a border that bears on the at least one side edge. The border may be configured to be continuous or with interruptions. Alternatively, a plurality of cylindrical pins cylindrical extending upwards from the upper side of the clamping platform may form the stop.

In order to keep the required clamping forces small, the active surfaces of each mount, that is to say the borders or pins and/or the clamping faces of the clamping jaws, may be provided with a material that increases the coefficient of friction between the microtiter plate to be mounted and the active surfaces. For example, rubber may be envisaged as a friction-increasing material.

In another embodiment, which is advantageous in terms of design, the entrainer is moved to actuate the two clamping jaws to and fro along the straight line with the linear drive having a motor-driven rotatable threaded spindle. At least one movement thread, which is applied onto the threaded spindle, is fastened on the entrainer. The threaded spindle is axially fixed, for example by the rotary drive for the threaded spindle being fastened on the upper side of the clamping platform by screwing. The at least one movement thread can be displaced linearly together with the entrainer along the straight line on the upper side of the clamping platform.

The linear drive, which has the threaded spindle and the movement thread, is preferably configured to be self-locking so that the clamping of the microtiter plates that is caused by the two clamping jaws in the pairwise arranged mounts is maintained even without further driving of the drive motor of the linear drive. In principle, the clamping may also be caused by continuous driving of the drive motor of the linear drive, although this presupposes a requisite layout for this continuous operation in order to avoid excessive heating of the drive motor.

The motor of the linear drive may, for example, be a stepper motor or a servomotor. The servomotor has the advantage that force monitoring is possible. By the current drawn by the servomotor, it is possible to identify whether the clamping jaws are in the retracted or deployed position, i.e. the clamping position. Switching elements for monitoring the position of the entrainer and/or of the clamping jaws are superfluous. If a relatively inexpensive stepper motor is used as the drive motor, however, the position of the entrainer and/or of the clamping jaws needs to be detected, for example by limit switches.

Economical and simple actuation of the clamping jaws of a plurality of mounts arranged pairwise along one of the straight lines is achieved in that the movement threads of a plurality of entrainers are applied on the threaded spindle of the linear drive. A plurality of entrainers are in this way moved by a common linear drive.

The actuation of the clamping jaws is in each case carried out by a link control, which in particular has a slot or a groove. In each guide link there is a guide element, also referred to as a link block, onto which the movement of the guide link is transmitted. The guide element, in particular a cylindrical pin, engaging in the guide link is located at a first end in the retracted position of the clamping jaw and at a second end of the guide link in the deployed position of the clamping jaw.

The effect of the guide edge of each guide link making an acute angle with the associated straight line on the upper side of the clamping platform is that the clamping jaws are moved perpendicularly to the straight line from the retracted position into the deployed position by the linear movement of the entrainer along the straight line. The size of the angle determines the length of the displacement path of the entrainer that is necessary in order to bring the clamping jaws to bear on the microtiter plate in the deployed position. A smaller acute angle and a longer displacement path of the entrainer reduce the required driving forces of the linear drive in comparison with a larger acute angle with a shorter displacement path. Since each linear drive is also shaken by the mechanical shaker, it is advantageous to keep the motors small and their weight low. To this extent, small acute angles of less than 30° are preferable.

The geometry of each guide link in the entrainer is preferably determined for the tolerance compensation in such a way that the width of each guide link increases from the first end in the direction of the second end. Without the widening of the guide links in the direction of the second end in conjunction with the preloaded compression spring between the two clamping jaws, clamping forces of different strength would occur in the event of tolerances in the dimensions of the microtiter plates to be clamped. The increased width of the guide link in the direction of its second end, however, makes it possible for the clamping jaw to be separated to a greater or lesser extent from the outwardly facing guide edge of the guide link against the force of the compression spring during the deployment, as a function of the dimensional tolerance, and for the clamping forces of the compression spring to be applied onto the clamping jaws. A displacement path difference of the two clamping jaws leads only to a minor difference of the clamping forces via the spring characteristic of the compression spring.

In principle, the geometry of the guide links may also be determined in such a way that their width is constant over the entire length, in which case the width is to be determined in such a way that the guide element can be moved away from the outwardly facing guide edge of the guide link in the deployed position.

If the actuation of the clamping jaws of a plurality of pairs of mounts is carried out with a common linear drive, a tolerance compensation is likewise achieved by the widening of each link in conjunction with the preloaded compression springs. Despite matching travels of the entrainers, the clamping jaws may be deployed to different extents in the plurality of pairs of mounts in the event of dimensional tolerances of the microtiter plates.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail below with the aid of the two figures, in which.

DETAILED DESCRIPTION OF THE INVENTION

In biotechnology and process technology, shaken reactor systems are used for the cultivation of biological systems. The mechanical shaker consists of a drive unit and a horizontal support, the clamping platform (1) represented in plan view in FIGS. 1 and 2 for receiving a plurality of microtiter plates (2).

Figure 1:
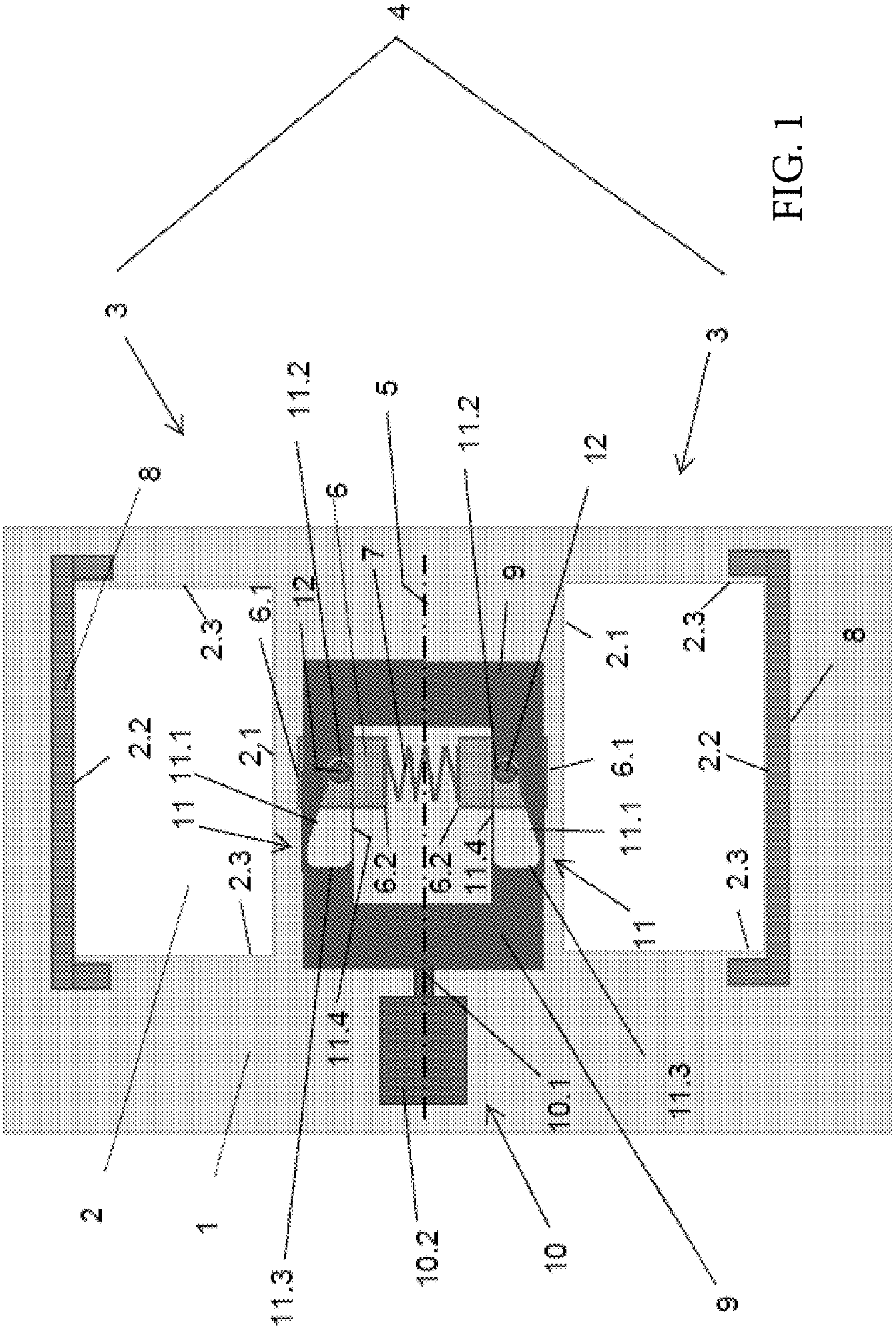
FIG. 1 is a schematic plan view of the clamping platform of a mechanical shaker before the fastening of the microtiter plates.
Figure 2:
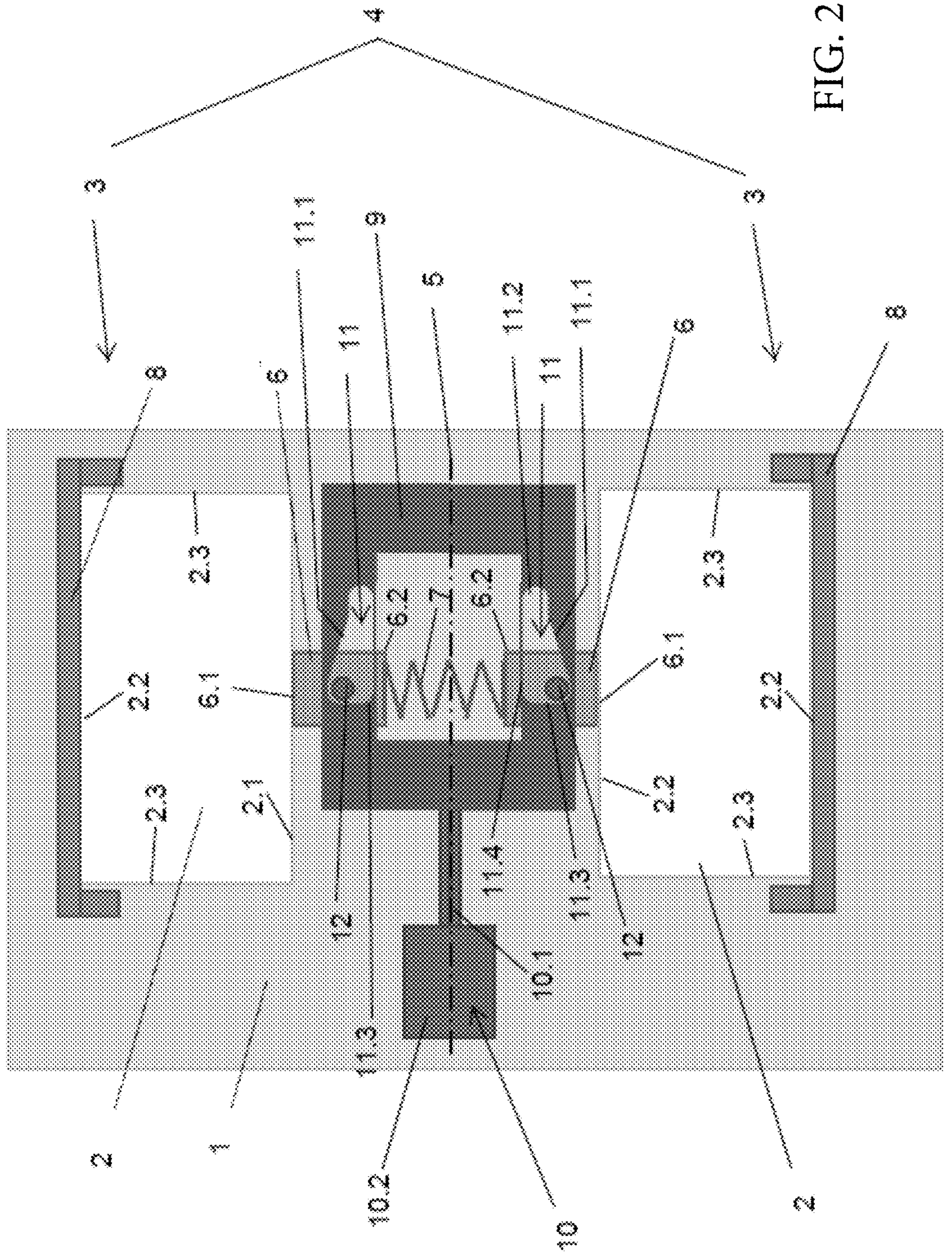
FIG. 2 is a plan view of the clamping platform according to FIG. 1 with fastened microtiter plates.
Figure 3:
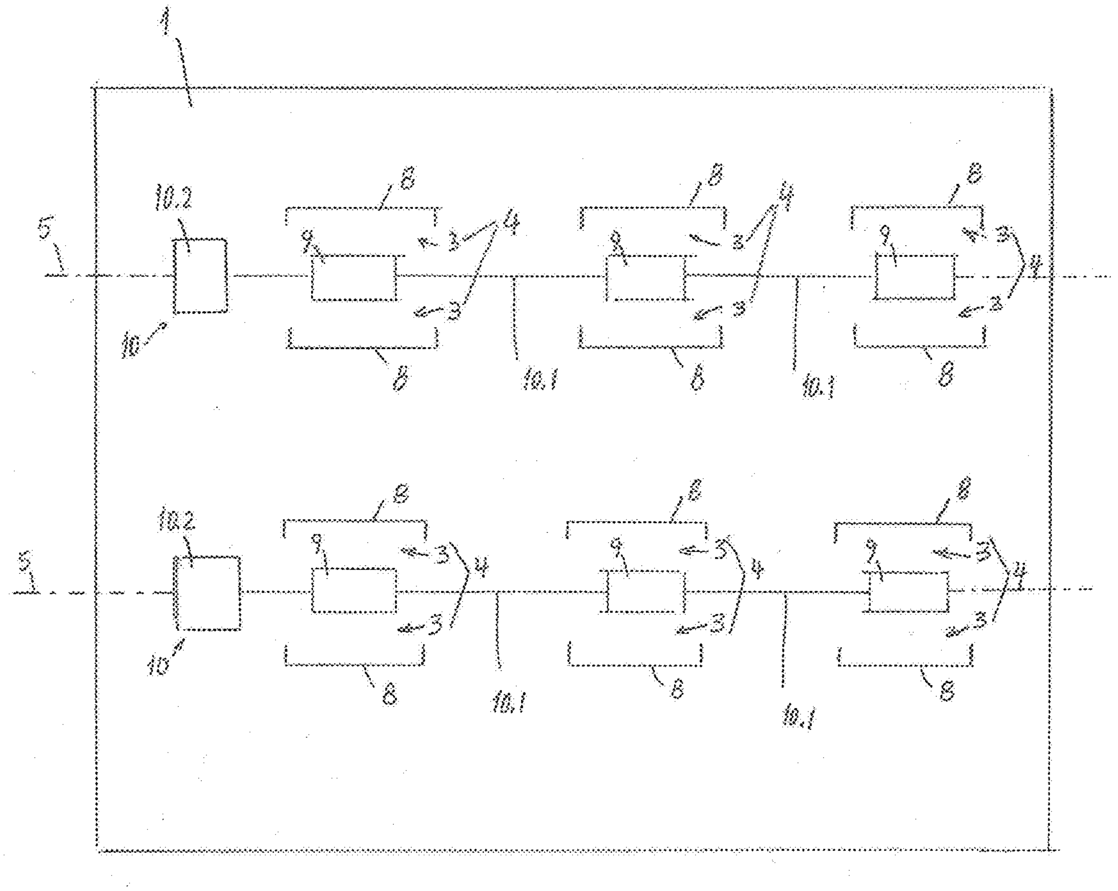
FIG. 3 is a schematic plan view of a clamping platform according to another embodiment of the invention having a plurality of pairs of mounts.

For the sake of clarity only two microtiter plates (2) are represented on the surface of the clamping platform (1) in the schematic representation of the exemplary embodiment shown in FIGS. 1 and 2. In practical embodiments, more than two microtiter plates (2) are generally fixed on the clamping platform (1) in order to parallelize a relatively large number of reactions as shown in FIG. 3, which is described in more detail below. The drive unit of the mechanical shaker is located underneath the clamping platform (1).

Figure 4:
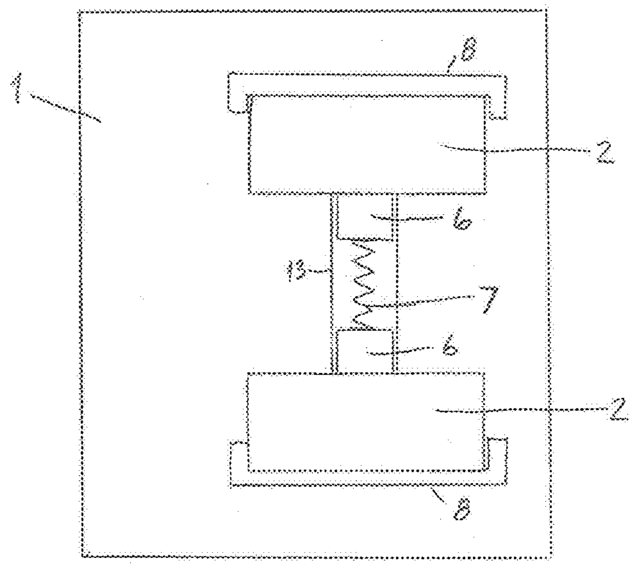
FIG. 4 is a schematic plan view of the clamping platform of FIG. 1 showing a linear guide.

The clamping platform (1) in FIGS. 1 and 2 has two mounts (3) arranged as a pair (4) mirror-symmetrically with respect to a straight line (5) on the upper side of the clamping platform (1) for the releasable fastening of the two rectangular microtiter plates (2). The two mounts (3) of the pair (4) each have a clamping jaw (6), which can be moved to and fro perpendicularly to the straight line (5) between a deployed position (represented in FIG. 2) and a retracted position (represented in FIG. 1) and has a clamping face (6.1) and a bearing face (6.2). The two clamping jaws (6) of the two mounts (3) are configured to be movable to and fro perpendicularly to the straight line (5) by a linear guide (13) (the linear guide (13) is shown in FIG. 4) in relation to the upper side of the clamping platform (1). The linear guide (13) is configured as a groove formed in the upper side of the clamping platform (1), with a spring (7) that is respectively arranged on the lower side of the two clamping jaws (6) engaging in the groove.

As may be seen in FIG. 2, in the deployed position of the clamping jaws (2), the clamping faces (6.1) of the two clamping jaws (6) come to bear on a first side edge (2.1) of the microtiter plates (2) to be fastened.

The spring (7) is a preloaded compression spring (7) arranged between the bearing faces (6.2) of the two clamping jaws (6) of the pair (4).

The two mounts (3) of the pair (4) each have a stop (8), which is fastened in a fixed position on the upper side of the clamping platform (1) and on which the two microtiter plates (2) to be fastened each come to bear with a second side edge (2.2), which lies opposite the first side edge (2.1), when they are placed in the mount (3). In the exemplary embodiment, the stop (8) is configured in such a way that the microtiter plates (2) to be fastened come to bear not only with the second side edge (2.2) but furthermore on the two short side edges (2.3) that connect the first and the second side edge (2.1, 2.2). This way, the microtiter plates (2) to be fastened are gripped on three side edges (2.1,2.3,2.3) so that movement of the microtiter plates (2) in the direction of the straight line (5) due to the shaking movement of the clamping platform is prevented, regardless of the level of the clamping force exerted on the first side edge (2.1) by the clamping jaws (6).

An entrainer (9) is arranged so that it can be moved to and fro by a linear drive (10) along the straight line (5) between the two mounts (3) of the pair (4). The entrainer (9) is configured as a rectangular frame in the exemplary embodiment, two guide links (11) being introduced into the longitudinal branch of the rectangular frame, mirror-symmetrically with respect to the straight line (5). Each of the two guide links (11) is configured as a slot. An outwardly facing guide edge (11.1) of each of the two guide links (11) makes an acute angle with the straight line (5) on the upper side of the clamping platform (1). The inner edges (11.4) of the two guide links (11), however, run parallel to the straight line (5).

A guide element (12), which engages in one of the two guide links (11), is respectively fastened on the upper side of each of the two clamping jaws (6). The guide element (12) is configured as a cylindrical pin extending upwardly from the upper side of the clamping jaw (6). In the retracted position (represented in FIG. 1) of the two clamping jaws, the guide element (12) bears on the first end (11.2) of the guide link (11). By the displacement of the entrainer (9) along the straight line (5), a relative movement takes place between the guide link (11) and the guide element (12), the effect of which is that the clamping jaw (6) of each of the two mounts (3) is moved from the retracted position represented in FIG. 1 into the deployed position represented in FIG. 2. In this case, the guide element (12) initially moves along the guide edge (11.1) of the guide link (11) until the clamping face (6.1) of the clamping jaw (6) comes to bear on the side edge (2.1) of the microtiter plate (2) to be fastened.

The geometry of the two guide links (11), in particular the width of the guide link (11), the length of the guide edge (11.1) and its angle with respect to the straight line (5), is defined in such a way that the guide element (12) is moved against the force of the compression springs (7) away from the outwardly facing guide edge (11.1) of the guide link (12) in each mount (3) during the movement of the clamping jaw (6) into the deployed position, so that the compression spring (7) transmits the required pressure forces via the bearing face (6.2) of the two clamping jaws (6) onto the clamping faces (6.1) of the clamping jaws (6), and therefore onto the first side edge (2.1) of the microtiter plates (2) to be fastened. In the deployed position of the clamping jaw (6), the guide element (12) is located at the second end (11.3) of the guide link (11).

If, however, the clamping forces in the two mounts of a pair were generated only by the interaction of a guide link and a guide element engaging without play, excessive or insufficient and/or nonuniform clamping forces would occur in the two mounts due to dimensional tolerances of the microtiter plates. The geometry of the mirror-symmetrically arranged guide links (11) that receive the guide element (12) at least in sections with play, in conjunction with the pressure springs (7), therefore allows the required compensation for the tolerances of the standardised microtiter plates (2).

The linear drive (10) preferably comprises a motor-driven rotatable threaded spindle (10.1) driven by a drive motor (10.2). The threaded spindle (10.1) cooperates with at least one movement thread that is connected for conjoint rotation to the entrainer (9). By the rotation of the threaded spindle (10.1), which for the sake of clarity is not fully represented in the plan view, the entrainer (9) is moved to and fro along the straight line (5). The drive motor (10.2) of the linear drive (10) is preferably a servomotor, so that switching elements for monitoring the position of the entrainer (9) and therefore for controlling the clamping jaws (6) are superfluous.

FIG. 3 shows an arrangement of six pairs (4) of mounts (3) arranged on first and second straight lines (5). Three pairs (4) of the mounts (3) are arranged mirror-symmetrically with respect to the first straight line (5) on an upper side of the Figure and another three pairs (4) of mounts (3) are arranged mirror-symmetrically with respect to the second straight line (5) on the lower side of the Figure. In the embodiment of FIG. 3, the entrainer (9) of each of the three pairs (4) of the upper straight line (5) are actuated by one linear drive (10). Likewise, the entrainers (9) of each of the three pairs (4) of the lower straight line (5) are actuated by another linear drive (10).

Thus, while there has been shown and described and pointed out the fundamental novel features of the invention is applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

| No | Meaning |
|---|---|
| 1. | clamping platform |
| 2. | microtiter plate |
| 2.1 | first side edge |
| 2.2 | second side edge |
| 2.3 | short side edge |
| 3. | mount |
| 4. | pair |
| 5. | straight line |
| 6. | clamping jaw |
| 6.1 | clamping face |
| 6.2 | bearing face |
| 7. | compression spring |
| 8. | stop |
| 9. | entrainer |
| 10. | linear drive |
| 10.1 | threaded spindle |
| 10.2 | Drive motor |
| 11. | guide link |
| 11.1 | guide edge |
| 11.2 | first end |
| 11.3 | second end |
| 11.4 | inner edge |
| 12. | guide element |

What is claimed is:

1. A clamping platform for a mechanical shaker, comprising a plurality of mounts each for releasably fastening a rectangular microtiter plate on the clamping platform, the plurality of mounts forming at least one pair of mounts arranged on opposing sides of a straight line on an upper side of the clamping platform, each of the at least one pair of mounts including two mounts of the plurality of mounts, the at least one pair of mounts including two clamping jaws respectively arranged on the two mounts, each clamping jaw of the two clamping jaws being movable to and fro perpendicularly to the straight line between a deployed position and a retracted position and has a clamping face and a bearing face, the clamping face of the each clamping jaw can be brought to bear in the deployed position on a first side edge of the microtiter plate to be fastened, the at least one pair of mounts including a preloaded compression spring arranged between the bearing faces of the two clamping jaws of the two mounts, the two mounts each have a stop in a fixed position on which a second side edge of the microtiter plate to be fastened can be brought to bear, the second side edge lying opposite the first side edge, an entrainer for the at least one pair of mounts and a linear drive are arranged so that the entrainer can be moved to and fro by the linear drive along the straight line between the two mounts, the entrainer having two guide links arranged on the opposing sides of the straight line, each guide link having an outwardly facing guide edge, guide elements fastened to each of the two clamping jaws of the at least one pair of mounts each engage in one of the two guide links, the each of the two clamping jaws being movable from the retracted position into the deployed position and vice versa by the relative movement between the guide links and the guide elements, and the geometry of the two guide links is defined in such a way that the guide elements can be moved against the force of the compression springs away from the outwardly facing guide edge of the guide link during the movement of the clamping jaw from the retracted position into the deployed position.

2. The clamping platform according to claim 1, wherein the at least one pair of mounts includes a plurality of pairs of mounts, a plurality of straight lines are arranged with a parallel spacing from one another on the upper side of the clamping platform and a subset of the plurality of pairs of mounts are arranged mirror-symmetrically with respect to each of the plurality of straight lines.

3. The clamping platform according to claim 1, further comprising a linear guide in relation to the upper side of the clamping platform, the two clamping jaws of the at least one pair of mounts can be moved to and fro perpendicularly to the straight line guided by the linear guide.

4. The clamping platform according to claim 1, wherein at least one of the clamping face and the bearing face of the each clamping jaw are planar.

5. The clamping platform according to claim 1, wherein each stop is arranged in a fixed position on the clamping platform such that the microtiter plate to be fastened can be brought to bear on the stop with the second side edge and two side edges that connect the first and the second side edge of the microtiter plate.

6. The clamping platform according to claim 1, wherein the linear drive has a motor-driven rotatable threaded spindle and at least one movement thread arranged on the entrainer and threadably received on the threaded spindle.

7. The clamping platform according to claim 6, wherein the threaded spindle is axially fixed and the entrainer is supported linearly displaceably along the straight line in a framework.

8. The clamping platform according to claim 6, wherein the linear drive is adapted such that the at least one movement thread of a plurality of the entrainers is applied onto the threaded spindle.

9. The clamping platform according to claim 1, wherein each guide link is configured as a slot or groove, the guide element that engages in the guide link being located at a first end of the guide link in the retracted position of the clamping jaw and at a second end of the guide link in the deployed position of the clamping jaw.

10. The clamping platform according to claim 9, wherein the width of each guide link increases from the first end toward the second end.

11. The clamping platform according to claim 1, wherein each guide element is configured as a cylindrical pin.

12. The clamping platform according to claim 1, wherein the outwardly facing guide edge of each guide link forms an acute angle with the straight line on the upper side of the clamping platform.

13. A mechanical shaker having a clamping platform according to claim 1.

14. The clamping platform according to claim 1, wherein the at least one pair of mounts and the two guide links are arranged mirror symmetrically with respect to the straight line.

* * * * *